(12) United States Patent
Peck

(10) Patent No.: US 8,205,821 B2
(45) Date of Patent: Jun. 26, 2012

(54) ENGINE PROPULSION SYSTEM AND METHODS OF ASSEMBLING THE SAME

(75) Inventor: Robert Andrew Peck, Loveland, OH (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 11/610,077

(22) Filed: Dec. 13, 2006

(65) Prior Publication Data

US 2008/0141653 A1 Jun. 19, 2008

(51) Int. Cl.
*B64C 27/22* (2006.01)

(52) U.S. Cl. ........... 244/7 A; 60/770; 60/228; 60/230; 244/10; 244/17.11; 244/6; 239/265.25; 239/265.27

(58) Field of Classification Search ........... 60/770, 60/228, 230; 244/10, 17.11, 6, 7; 239/265.25, 239/265.27
See application file for complete search history.

(56) References Cited

U.S. PATENT DOCUMENTS

| | | | |
|---|---|---|---|
| 3,972,490 A | 8/1976 | Zimmermann et al. | |
| 5,996,935 A | 12/1999 | Snell | |
| 6,382,560 B1 | 5/2002 | Ow | |
| 6,629,670 B1 | 10/2003 | Shah | |
| 6,729,575 B2 | 5/2004 | Bevilaqua | |
| 6,789,764 B2 * | 9/2004 | Bass et al. ........... | 244/10 |
| 6,845,939 B1 | 1/2005 | Baldwin | |
| 6,848,649 B2 | 2/2005 | Churchman | |
| 6,886,776 B2 | 5/2005 | Wagner et al. | |
| 6,918,244 B2 | 7/2005 | Dickau | |
| 6,974,106 B2 | 12/2005 | Churchman | |
| 7,070,145 B2 | 7/2006 | Baldwin | |
| 7,624,942 B2 * | 12/2009 | Roberge ........... | 244/7 A |
| 2003/0033798 A1 | 2/2003 | Dickau | |
| 2003/0183723 A1 | 10/2003 | Bevilaqua | |
| 2007/0050064 A1 | 3/2007 | Burgess et al. | |

FOREIGN PATENT DOCUMENTS

JP 2006322394 11/2006

OTHER PUBLICATIONS

He et al., "Iso-parametric CNC tool path optimization based on adaptive grid generation", The International Journal of Advanced Manufacturing Technology, Springer, Berlin, DE, vol. 41, No. 5-6, May 22, 2009, pp. 538-548.

An International Search Report, dated Nov. 27, 2009, from the International Searching Authority for co-pending International Application No. PCT/US2009/049551 (4 pages).

* cited by examiner

*Primary Examiner* — Ehud Gartenberg
*Assistant Examiner* — Craig Kim
(74) *Attorney, Agent, or Firm* — David J. Clement, Esq.; Armstrong Teasdale LLP

(57) ABSTRACT

A method for exhausting gas from an aircraft engine assembly is provided. The method includes coupling a first exhaust duct in fluid communication only to a first engine. The first exhaust duct includes a primary outlet and a secondary outlet. The method further includes coupling a second exhaust duct in fluid communication only to a second engine. The second exhaust duct includes a primary outlet and a secondary outlet. The method also includes aligning a portion of the first engine secondary outlet concentrically within a portion of the second engine secondary outlet.

20 Claims, 5 Drawing Sheets

ENGINE PROPULSION SYSTEM AND METHODS OF ASSEMBLING THE SAME

STATEMENT REGARDING FEDERALLY SPONSORED RESEARCH & DEVELOPMENT

The U.S. Government has certain rights in this invention as provided for by the terms of Contract No. MDA 972-98-9-0009 awarded by the Defense Advanced Research Projects Agency (DARPA).

BACKGROUND OF THE INVENTION

This invention relates generally to aircraft turbine engines, and more specifically, to propulsion systems used with a multiple turbine engine assembly.

In some known aircraft, propulsion systems are used to control a flow of exhaust gases for a variety of aircraft functions. For example, such systems can be used to provide thrust for Vertical Take-Off and Landing (VTOL), Short Take-Off Vertical Landing (STOVL) and/or Extreme Short Take-Off and Landing (ESTOL) aircraft. At least some known STOVLs and ESTOLs use vertical thrust posts to facilitate short and extremely short take-offs and landings. In aircraft using vertical thrust posts or nozzles, exhaust from a common plenum is channeled to thrust posts during take-off and landing operations, and, at a predetermined altitude, through a series of valves, the exhaust is channeled from the common plenum to a cruise nozzle.

Other known STOVLs and ESTOLs use rotor tip gas reaction driven rotors and rotor tip driven rotors to facilitate vertical take-offs and landings. During flight, some such rotor-driven aircraft can transform into fixed wing aircraft. In some of such aircraft, the engine exhaust gases may also be used to control yaw through aft mounted variable area exhaust nozzles. Other known aircraft use the propulsion system to reduce drag on the aircraft, and/or cool aircraft wings. In such aircraft, gases are channeled through the wings of the aircraft and discharge through a plurality of openings defined in a trailing portion of the wing. Such aircraft are sometimes referred to as having "blown wings".

Because single engine assemblies may limit the survival capabilities of the aircraft when engine power loss occurs, each of the above described propulsion systems may be preferred to be used with a multiple, especially a dual, engine assembly. In a single engine assembly, the engine exhausts into a plenum where it is then channeled via the propulsion system for use by the aircraft. In a dual engine propulsion control system, each engine exhausts into a common plenum wherein the exhaust is channeled for use by the aircraft. However, because the exhausts are mixed in a common plenum, if one engine stalls, fails, or is in any way rendered inoperable, the exhaust flow from that engine may not enter the plenum. The associated pressure drop in the plenum may adversely affect the operation of the propulsion system and valves must be provided to prevent back flow of exhaust gases into the inoperable engine.

A control system must also be provided to actuate these valves at a high slew rate to prevent the operable engine from stalling. Such a control system capability has been envisioned but is not known to have been demonstrated. Such a control system would be required to make major airflow adjustments in the propulsion system that may include closing valves to prevent loss of plenum pressure through the inoperable engine and to attempt to redirect nozzle areas to facilitate retaining flight stability. Such significant readjustments of nozzle area configuration may lead to the stall of the operational engine and may cause a complete loss of lift. Furthermore, it may be difficult for the control system to increase the power setting of the operable engine to an emergency level.

Because of the time and cost of developing a control system and implementing the mechanical complexity created by such propulsion systems having multiple engines exhaust into a common plenum, such propulsion systems may be much more costly than those used with single engine assemblies. For example, to provide exhaust control, such propulsion systems include a plurality of sensors and valves that can be selectively actuated to isolate an inoperable engine. More specifically, known propulsion systems used with dual engine assemblies include a plurality of butterfly valves and actuation systems that direct the exhaust gases in the event of an engine power loss. The valves enable an inoperable engine to be isolated to prevent back-flow through the inoperative engine. In addition, the isolation valves enable emergency flight capability and limited aircraft control with an inoperable engine. However, because such valves must operate at high temperatures, such valves and associated actuation systems may require large actuation forces. Furthermore, in known propulsion systems, once the valves have been closed to isolate an inoperable engine, it is not possible to attempt to restart an inoperable engine.

BRIEF DESCRIPTION OF THE INVENTION

In one aspect a method for exhausting gas from an aircraft engine assembly is provided. The method includes coupling a first exhaust duct in fluid communication only to a first engine. The first exhaust duct includes a primary outlet and a secondary outlet. The method further includes coupling a second exhaust duct in fluid communication only to a second engine. The second exhaust duct includes a primary outlet and a secondary outlet. The method also includes aligning a portion of the first engine secondary outlet concentrically within a portion of the second engine secondary outlet.

In another aspect an engine assembly is provided. The engine assembly includes a first engine including a first exhaust duct coupled in fluid communication only to the first engine. The first exhaust duct includes a primary outlet and a secondary outlet. The engine assembly further includes a second engine including a second exhaust duct coupled in fluid communication only to the second engine. The second exhaust duct includes a primary outlet and a secondary outlet. A portion of the first engine secondary outlet is aligned substantially concentrically within a portion of the second engine secondary outlet.

In a still further aspect a propulsion system for an aircraft is provided. The propulsion system includes a first engine including a first exhaust duct coupled in flow communication only to the first engine. The propulsion system further includes a second engine including a second exhaust duct coupled in flow communication only to the second engine. The first exhaust duct includes a primary exhaust and a secondary exhaust. The second exhaust duct includes a primary exhaust and a secondary exhaust. A portion of the first engine secondary exhaust is aligned substantially concentrically within a portion of the second engine secondary exhaust.

DETAILED DESCRIPTION OF THE INVENTION

Figure 1:
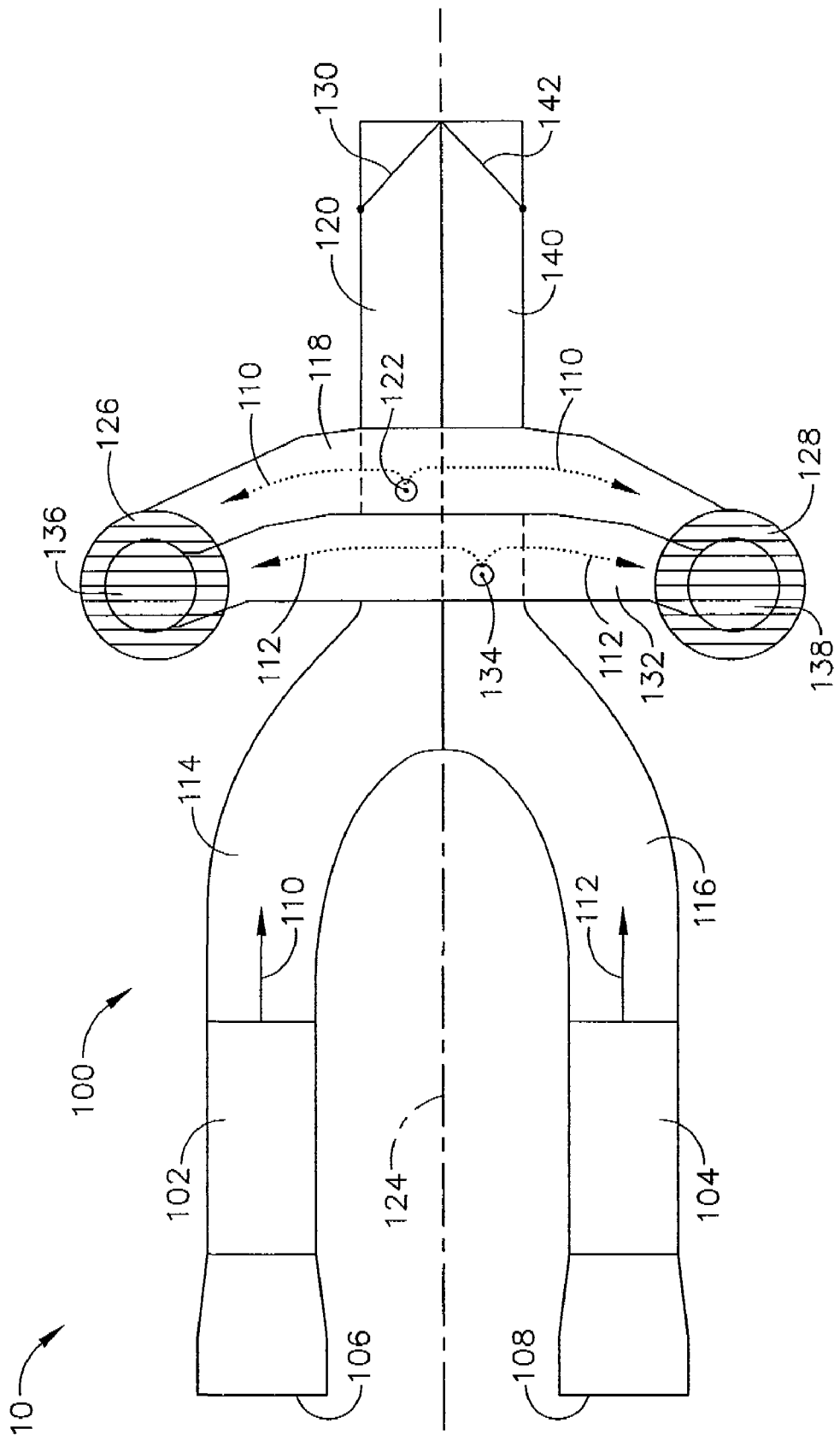
FIG. 1 is a top schematic view of an exemplary propulsion system that may be used with a multiple engine assembly.

FIG. 1 is a top schematic view of an exemplary propulsion system 100 that may be used with a multiple engine assembly 10 used with a VTOL, ESTOL and/or STOVL fixed wing aircraft (not shown). In the exemplary embodiment, engine assembly 10 includes a first engine 102 and a second engine 104. Alternately, propulsion system 100 can be used with engine assemblies 10 having more than two engines. In an exemplary embodiment, engine 102 includes a first inlet 106 and engine 104 includes a second inlet 108. Inlets 106 and 108 enable air to be channeled into engines 102 and 104, respectively. Exhaust gases 110 from first engine 102 are discharged through a first exhaust duct 114 and exhaust gases 112 from second engine 104 are discharged through a second exhaust duct 116.

In the exemplary embodiment, exhaust duct 114 is coupled in flow communication to a first lift duct 118 and to a first cruise duct 120. A first passageway 122 is coupled to duct 114 to enable exhaust gases 110 to be channeled from first duct 114 to first lift duct 118. In the exemplary embodiment, at least a portion of first lift duct 118 is oriented substantially perpendicularly to a center line 124 that extends between engines 102 and 104. Engine assembly 10 and propulsion system 100 are symmetric on each side of center line 124. In the exemplary embodiment, first lift duct 118 is coupled in flow communication to a starboard lift nozzle 126 and to a port lift nozzle 128. Alternately, lift nozzles 126 and 128 may be positioned other than starboard and port of center line 124. Furthermore, alternately, propulsion system 100 can have more or less than two lift nozzles 126 and 128. In the exemplary embodiment, lift nozzles 126 and 128, lift nozzles 136 and 138, and cruise nozzles 130 and 142, described in more detail below, are each variable area nozzles. The design, construction, and control of variable area nozzles are known in the art. The nozzles 126, 128, 130, 136, 138, and 142 may utilize clamshell or shutter valve designs as is known in the art. Actuation of nozzles 126, 128, 130, 136, 138, and 142 may be hydraulic, electric, or any other method known in the art. Alternately, propulsion system 100 can have more or less than two lift nozzles 126 and 128. Lift nozzles 126 and 128 extend from lift duct 118 generally toward the ground (not shown). More specifically, in the exemplary embodiment, lift nozzles 126 and 128 are each oriented such that during pre-defined engine operations, exhaust gases 110 discharged therefrom facilitate enabling generally vertical take-off and landing (VTOL) of the aircraft, short take-off and vertical landing (STOVL), and/or extremely short take-off and landing (ESTOL).

First cruise duct 120 is coupled in flow communication to duct 114 and extends generally parallel to center line 124. In the exemplary embodiment, during pre-defined engine operations, exhaust gases 110 are channeled from duct 114 into cruise duct 120, wherein the gases 110 may be discharged through a first cruise nozzle 130 to generate thrust from the aircraft. More specifically, first cruise nozzle 130 facilitates propelling the aircraft in a direction that is generally parallel to center line 124.

In the exemplary embodiment, second duct 116 is coupled in flow communication to a second lift duct 132 via a second passageway 134. During pre-defined engine operations, exhaust gases 112 discharged from engine 104 may be channeled from duct 116 through passageway 134 to lift duct 132. In the exemplary embodiment, at least a portion of second lift duct 132 is oriented substantially perpendicularly to center line 124. Moreover, in the exemplary embodiment, second lift duct 132 is coupled in flow communication to a second starboard lift nozzle 136 and to a second port lift nozzle 138. Alternately, lift nozzles 136 and 138 may be positioned other than starboard and port of center line 124. Furthermore, alternately, propulsion system 100 can have more or less than two lift nozzles 136 and 138. Lift nozzles 136 and 138 extend from lift duct 132 and are oriented such that exhaust gases 112 discharged therefrom are discharged generally towards the ground. More specifically, in an exemplary embodiment, second lift nozzles 136 and 138 are each oriented such that during pre-defined engine operations, exhaust gases 112 discharged from lift nozzles 136 and 138 facilitate enabling generally vertical take-off and landing of the aircraft, STOVL, and/or ESTOL. Furthermore, in the exemplary embodiment, a portion of each second lift nozzle 136 and 138 extends substantially concentrically within a portion of each of lift nozzles 126 and 128, respectively. Alternately, a portion of each of first lift nozzles 126 and 128 extends substantially concentrically within a portion of each of lift nozzles 136 and 138, respectively.

In the exemplary embodiment, second duct 116 is coupled to a second cruise duct 140. Cruise duct 140 extends generally parallel to center line 124 and is positioned adjacent to cruise duct 120. In the exemplary embodiment, during pre-defined engine operations, exhaust gases 112 are channeled from second duct 116 into cruise duct 140 wherein the gases 112 may be discharged through a second cruise nozzle 142. More specifically, second cruise nozzle 142 facilitates propelling the aircraft in a direction that is generally parallel to center line 124.

For generally vertical take-off and landing, STOVL, and/or ESTOL, cruise nozzles 130 and 142 are closed from a first position to a closed second position, and lift nozzles 126, 128, 136, and 138 are opened from a first position to an open second position. Control design and control laws required for progressive actuation of nozzles 126, 128, 130, 136, 138, and 142 during pre-defined engine operations are known in the art. When first cruise nozzle 130 is closed, exhaust gases 110 are forced from first duct 114 into first passageway 122 wherein the gases 110 are discharged into first lift duct 118. Exhaust gases 110 are then discharged from first lift duct 118 through first lift nozzles 126 and 128 to facilitate vertical thrust. Similarly, in the exemplary embodiment, when second cruise nozzle 142 is closed, exhaust gases 112 are forced from second duct 116 into second lift duct 132 via second passageway 134 wherein exhaust gases 112 are the discharged through second lift nozzles 136 and 138. Thrust from exhaust gases 112 discharged through second lift nozzles 136 and 138 combine with exhaust gases 110 discharged through first lift nozzles 126 and 128 to facilitate generally vertical take-off and landing, and/or STOLV, and/or ESTOL of the aircraft.

Once the aircraft has reached a pre-determined altitude, in the exemplary embodiment, cruise nozzles 130 and 142 are opened from the closed second position to the first position while lift nozzles 126, 128, 136, and 138 are closed from the open second position to the first position. With lift nozzles 126, 128, 136, and 138 closed, exhaust gases 110 and 112 are channeled from first duct 114 and second duct 116, respectively, into cruise ducts 120 and 140, respectively, wherein exhaust gases 110 and 112 are discharged through cruise nozzles 130 and 142, respectively. As exhaust gases 110 and 112 are discharged through cruise nozzles 130 and 142, respectively, the thrust from the exhaust gases 110 and 112 facilitates propelling the aircraft in a direction that is generally parallel to center line 124. During pre-defined engine operations in which propulsion in a direction that is generally non-parallel to center line 124 is changed to propulsion in a direction that is generally parallel to center line 124, propulsion system 100 enables the inoperability of engine 102 or 104 without unbalanced lift or thrust forces. Furthermore, in the exemplary embodiment, propulsion system 100 enables controlled propulsion in a direction that is generally parallel to center line 124 or controlled decent in a direction that is generally non-parallel to center line 124.

In the exemplary embodiment, each engine includes a starboard lift nozzle and a port lift nozzle that facilitates providing balanced lift. For example, if one engine is rendered inoperable during aircraft operation, the exhaust gases from the other engine enables a continued, balanced lift to be provided. The maintenance of balanced lift does not require any control intervention and/or the actuation of any exhaust valves to redirect exhaust gases, either internally or at the lift nozzles. The total lift may be reduced, but in a balanced and controlled manner due to the symmetric position of the lift nozzles and the symmetric geometry of the exhaust gas supply to the nozzles. A simple control command can increase the power of the functioning engine to potentially facilitate allowing continued flight. In the above-described exemplary embodiment, either engine may be rendered inoperable, yet the propulsion system may facilitate maintaining control of the aircraft, and/or increase the probability of aircraft survival, without enhanced control technology and the placement of air control valves in the internal flow circuits.

When the aircraft is in forward flight and wing borne, the loss of engine power will not require any valves present in the system to be actuated to prevent back flow from the functioning engine to the inoperable engine. The forward thrust will be maintained via the cruise nozzles without any control system action. Furthermore, an effort to restart the inoperable engine could be made without endangering the continued operation of the aircraft. Moreover, during the transition from channeling gases through the lift nozzles to channeling gases through the cruise nozzles, the propulsion system allows the inoperability of either engine without unbalanced lift or thrust forces such that operation of the aircraft may be continued.

Figure 2:
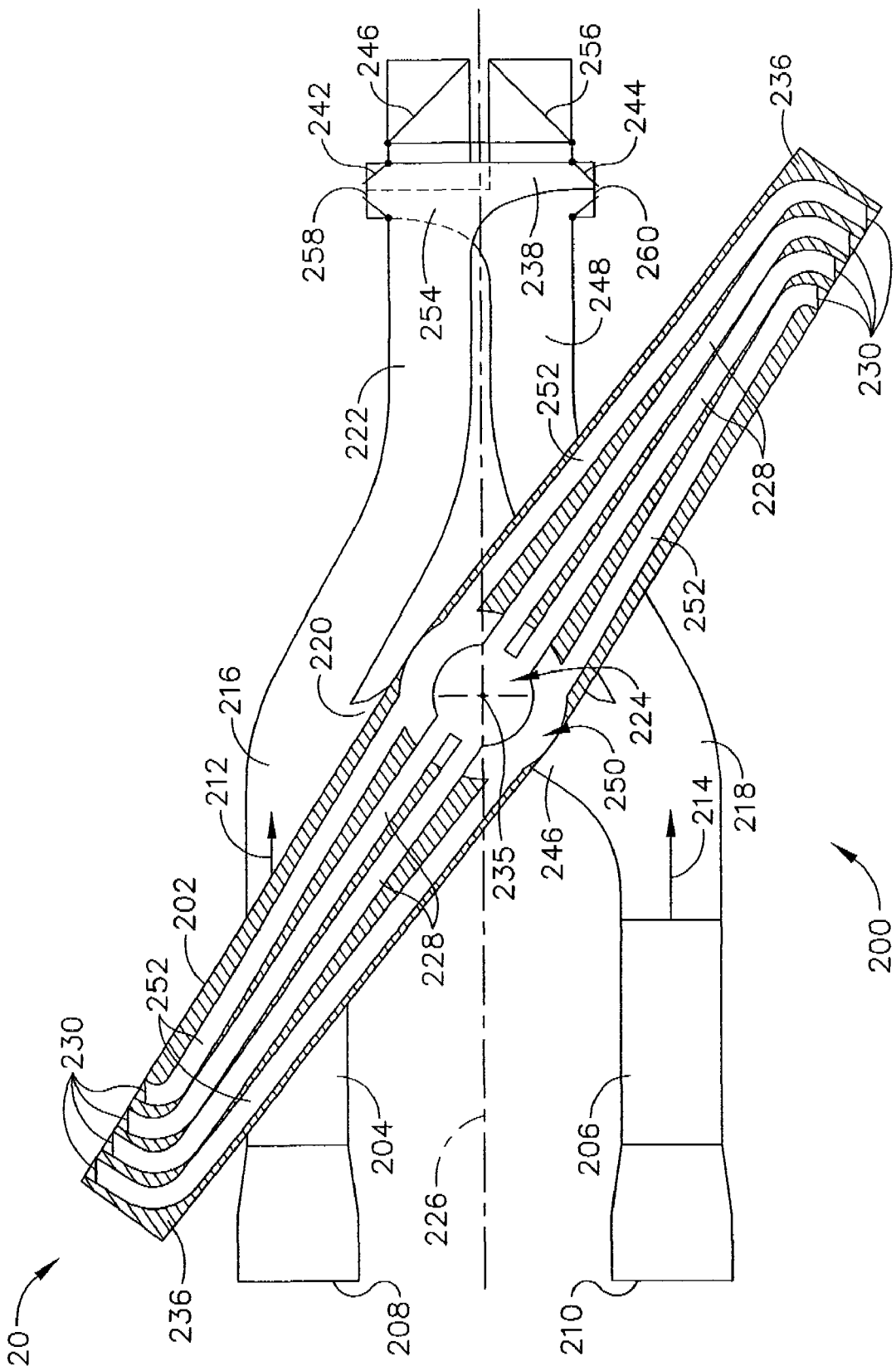
FIG. 2 is a top schematic view of an alternative embodiment of a propulsion system that may be used with a multiple engine assembly.
Figure 3:
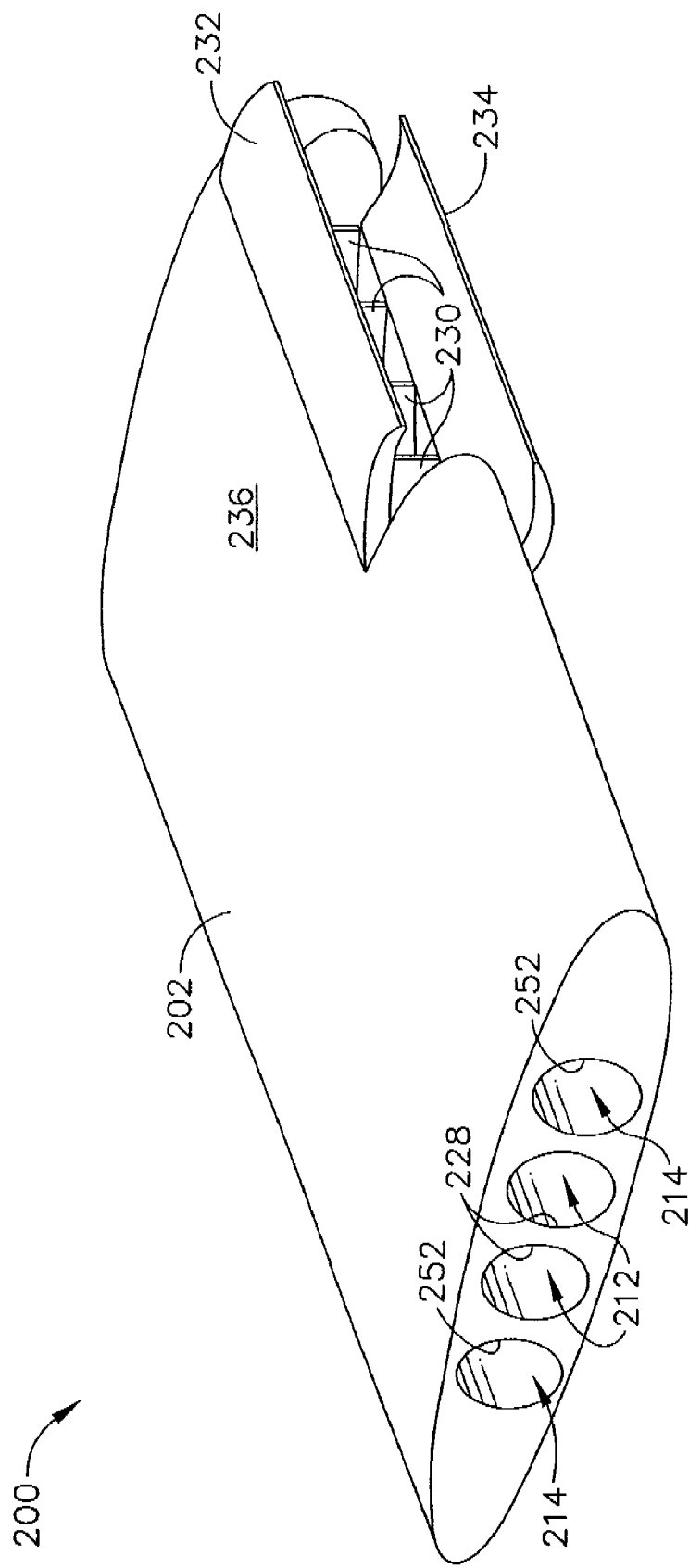
FIG. 3 is a perspective view of a portion of the propulsion system shown in FIG. 2.
Figure 4:
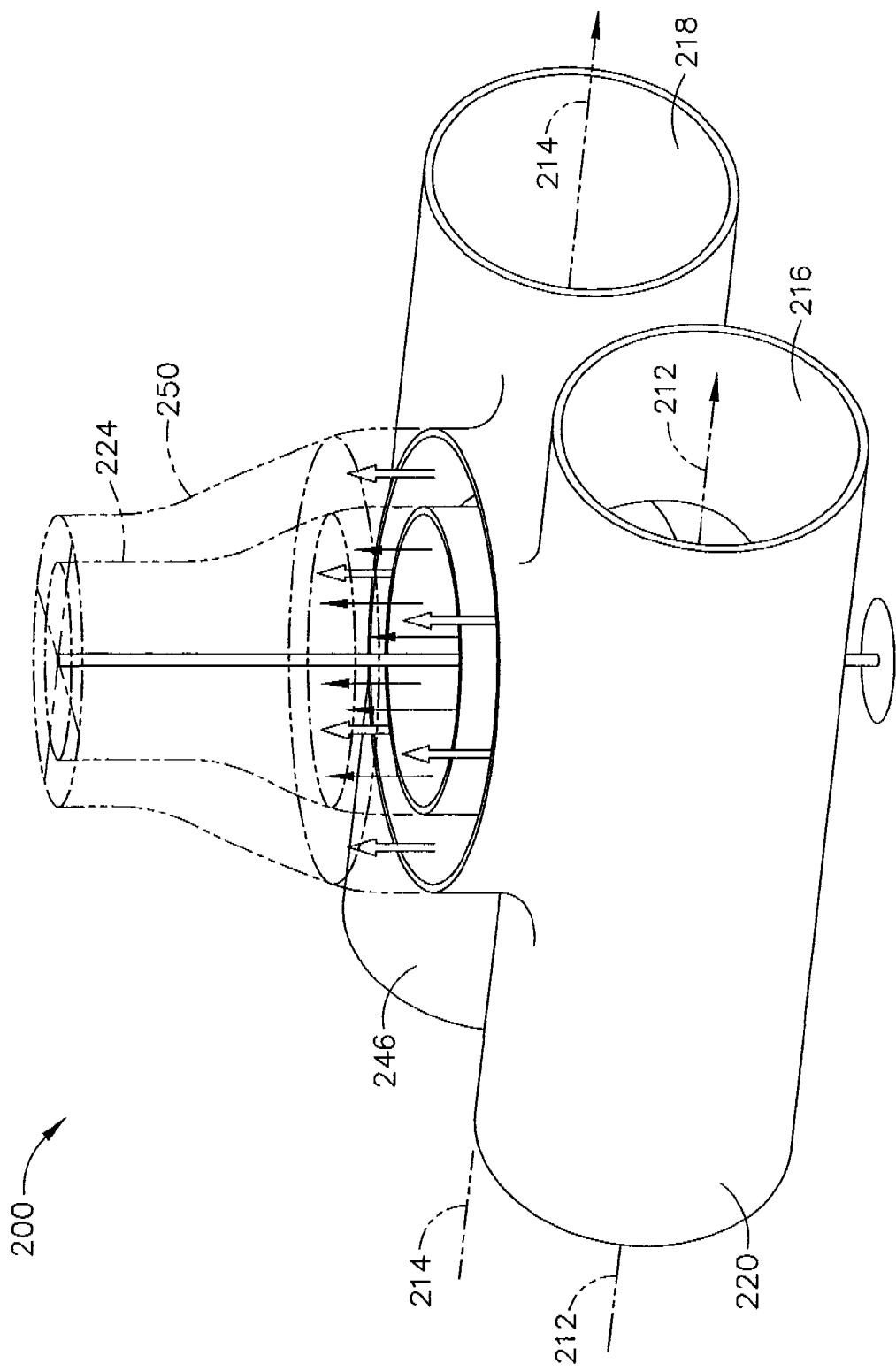
FIG. 4 is a perspective view of an exemplary plenum that may be used with the propulsion system shown in FIG. 2.

FIG. 2 is a top schematic view of an alternate embodiment of a propulsion system 200 that may be used with a rotary wing aircraft that transitions to a fixed wing aircraft having a multiple engine assembly 20. FIG. 3 is a portion of propulsion system 200 shown in FIG. 2. FIG. 4 is a perspective view of an exemplary plenum configuration that may be used to supply exhaust gases to the circuit associated with rotor blade 202 of propulsion system 200 shown in FIG. 2.

In the exemplary embodiment, engine assembly 20 includes a rotor blade 202, a first engine 204, and a second engine 206. Alternately, propulsion system 200 can be used with engine assemblies 20 having more than two engines. In an exemplary embodiment, engine 204 includes a first inlet 208, and second engine 206 includes a second inlet 210. Inlets 208 and 210 enable air to be channeled into engines 204 and 206, respectively. Exhaust gases 212 from first engine 204 are discharged through a first exhaust duct 216 coupled in flow communication to first engine 204. Similarly, exhaust gases 214 from second engine 206 are discharged through a second duct 218 coupled in flow communication to second engine 206.

In the exemplary embodiment, first exhaust duct 216 is coupled in flow communication to a first rotor duct 220 and to a first cruise duct 222. First rotor duct 220 is coupled in flow communication to a first rotor plenum 224. In the exemplary embodiment, at least a portion of rotor plenum 224 is oriented generally perpendicularly and upward from a center line 226 that extends between engines 204 and 206. Engine assembly 20 and propulsion system 200 are symmetric on each side of center line 226. Rotor plenum 224 is coupled in flow communication to a plurality of first rotor blade ducts 228 that extend through rotor blade 202 in a direction that is generally oriented from a rotor plenum center 235 to rotor blade ends 236. In the exemplary embodiment, rotor plenum 224 is coupled in flow communication to four first rotor blade ducts 228, two of which extend through one portion of rotor blade 202, and the remaining first rotor blade ducts 228 extend through the remaining portion of blade 202. Alternately, propulsion system 200 may include more or less than four first rotor blade ducts 228.

Each of the plurality of rotor blade ducts 228 is coupled in flow communication to a rotor nozzle 230. In the exemplary embodiment, each rotor nozzle 230 has a variable area. More specifically, in the exemplary embodiment, the area of each rotor nozzle 230 is varied via an upper flap 232 and a lower flap 234. Upper flap 232 and lower flap 234 are rotatably coupled to an end portion 236 of rotor blade 202. Upper flap 232 and lower flap 234 can be rotated with respect to rotor blade 202 to facilitate increasing or decreasing the area of rotor nozzles 230. In the exemplary embodiment, a plurality of rotor nozzles 230 share a single upper flap 232 and lower flap 234 to facilitate uniformly controlling the area of a plurality of rotor nozzles 230. Actuation of rotor tip nozzles 230, upper flap 232, and/or lower 234 may be hydraulic, electric, or other known actuation devices. The control of rotor tip tip nozzles 230, upper flap 232, and/or lower 234 is known in the art.

In the exemplary embodiment, during pre-defined engine operations, exhaust gases 212 may be used to facilitate directional control of the aircraft. More specifically, in the exemplary embodiment, first cruise duct 222 is coupled in fluid communication to a first yaw duct 238 and to a first cruise nozzle 240. In the exemplary embodiment, cruise nozzles 240 and 256, described in more detail below, are each variable area nozzles. The design, construction, and control of variable area nozzles are known in the art. Nozzles 240 and 256 may utilize clamshell or shutter valve designs as is known in the art. Actuation of nozzles 240 and 256 may be hydraulic, electric, or any other method known in the art. Moreover, first cruise duct 222 includes a starboard yaw control 242 defined therein. In the exemplary embodiment, yaw duct 238 is oriented generally perpendicularly to cruise duct 222, and is coupled to a port yaw control 244. During pre-defined engine operations, exhaust gases 212 are discharged from first cruise duct 222, through at least one of starboard yaw control 242, port yaw control 244, and cruise nozzle 240.

In the exemplary embodiment, second exhaust duct 218 is coupled in flow communication to a second rotor duct 246 and to a second cruise duct 248 that is positioned adjacent to cruise duct 222. Second rotor duct 246 is coupled in flow communication to a second rotor plenum 250. In the exemplary embodiment, at least a portion of second rotor plenum 250 is oriented generally perpendicularly and upward from center line 226. In the exemplary embodiment, a portion of first rotor plenum 224 extends substantially concentrically within a portion of second rotor plenum 250. Alternately, a portion of second rotor plenum 250 extends substantially concentrically within a portion of first rotor plenum 224.

Second rotor plenum 250 is coupled in flow communication to a plurality of second rotor blade ducts 252 that extend through rotor blade 202 in a direction that is generally oriented from rotor plenum center 235 to rotor blade ends 236. In the exemplary embodiment, second rotor plenum 250 is coupled in flow communication to four second rotor blade ducts 252, two of which extend through one portion of rotor blade 202, and the remaining second rotor blade ducts 252 extend through the remaining portion of blade 202. Alternately, propulsion system 200 may include more or less than four second rotor blade ducts 252. Each of the plurality of second rotor blade ducts 252 is coupled to one rotor nozzle 230, which is described in more detail above.

In the exemplary embodiment, during pre-defined engine operations, exhaust gases 214 may be used to facilitate directional control of the aircraft. More specifically, in the exemplary embodiment, second cruise duct 248 is coupled in flow communication to a second yaw duct 254 and to a second cruise nozzle 256. Moreover, cruise duct 248 has port yaw control 244 defined therein. In the exemplary embodiment, second yaw duct 254 is oriented generally perpendicularly to cruise duct 248, and is coupled to starboard yaw control 242. During pre-defined engine operations, at a starboard yaw control outlet 258, exhaust gases 212 discharged through first cruise duct 222 combine with exhaust gases 214 discharged through second yaw duct 254 to control a yaw of the aircraft. Similarly, at a port yaw control outlet 260, exhaust gases 212 discharged through first yaw duct 238 combine with exhaust gases 214 discharged through second cruise duct 248 to control yaw of the aircraft. Alternately, propulsion system 200 may be used to control directions other that the yaw of the aircraft. Moreover, in the exemplary embodiment, exhaust gases 214 may be discharged through duct 218 into cruise duct 248, and then through at least one of starboard yaw control 242, port yaw control 244, and second cruise nozzle 256.

For generally vertical take-off and landing, STOVL and/or ESTOL, cruise nozzles 240 and 256 are closed from a first position to a second position, and rotor nozzles 230 are open via moving upper flap 232 and lower flap 234 from a closed position to an open position. Movement of cruise nozzles 240 and 256 is coordinated with the movement of rotor nozzles 230. Control design and control laws required for progressive actuation of nozzles 230, 240, and 256 during pre-defined engine operations are known in the art. During pre-defined engine operations, exhaust gases 212 are channeled from first duct 216, through first rotor duct 220, and then channeled into first rotor plenum 224. Exhaust gases 212 are channeled from first rotor plenum 224 through first rotor blade ducts 228, and are then discharged from propulsion system 200 through rotor nozzles 230 to facilitate rotating rotor blade 202. Rotation of rotor blade 202 facilitates propelling the aircraft in a direction that is generally non-parallel to center line 226.

Similarly, in the exemplary embodiment, when second cruise nozzle 256 is closed from a first position to a second position, and rotor nozzles 230 are open via moving upper flap 232 and lower flap 234 from a closed position to an open position, exhaust gases 214 are channeled from second duct 218, through second rotor duct 246, and then channeled into second rotor plenum 250. During pre-defined engine operations, exhaust gases 214 are channeled from second rotor plenum 250 through second rotor blade ducts 252, and then are discharged from propulsion system 200 through rotor nozzles 230. More specifically, in the exemplary embodiment, exhaust gases 212 discharged through rotor nozzles 230 facilitate rotating rotor blade 202 wherein rotation of rotor blade 202 facilitates providing propelling the aircraft in a direction that is generally non-parallel to center line 226.

Once the aircraft has reached a pre-determined altitude, in the exemplary embodiment, cruise nozzles 240 and 256 are opened from the second position to the first position while rotor nozzles 230 are closed via upper flap 232 and lower flap 234. Movement of cruise nozzles 240 and 256 is coordinated with the movement of rotor nozzles 230. When rotor nozzles 230 are closed, rotor blade 202 may cease rotation such that blade 202 is oriented substantially perpendicularly to center line 226, and the aircraft transforms into a fixed wing aircraft. When the aircraft is operating as a fixed wing aircraft, upper flap 232 and lower flap 234 close to facilitate preventing exhaust gases 212 and 214 from discharging through rotor nozzles 230, and to facilitate reducing drag on rotor nozzles 230 facing fore. With flaps 232 and 234 closed, propulsion system 200 may have a greater capability for propelling the aircraft at a velocity in a direction that is generally parallel to center line 226. In an exemplary embodiment, a control system (not shown) may modify the pitch of rotor blade 202 to facilitate allowing the blade 202 to function more effectively as a wing.

During pre-defined engine operations, with rotor nozzles 230 closed, exhaust gases 212 and 214 are channeled from rotor ducts 220 and 246 through cruise ducts 222 and 248, respectively, and then through cruise nozzles 240 and 256, respectively. As exhaust gases 212 and 214 are discharged through cruise nozzles 240 and 256, respectively, the thrust from the exhaust gases 212 and 214 facilitates propelling the aircraft generally parallel to center line 226. In the exemplary embodiment, by opening and closing starboard yaw control 242 and/or port yaw control 244, exhaust 212 and 214 can be used to change a yaw of the aircraft. Control design and control laws required for the actuation of yaw control 242 and 244 during pre-defined engine operations are known in the art. Alternately, exhaust gases 212 and 214 may be channeled through propulsion system 200 for other directional control uses.

The propulsion system described above facilitates providing a balanced loss of rotor tip thrust if either engine is rendered inoperable without requiring an aircraft/engine control system beyond what is currently known in the art. The engine exhaust gases are channeled separately from each engine to each of the rotor blade tip nozzles to facilitate providing the balanced loss of rotor tip thrust. The propulsion system also enables aircraft stability to remain uncompromised. Furthermore, the yaw flow circuit incorporates a crossover of the engine exhaust circuits to supply exhaust gases to the yaw nozzles. The crossover of the yaw circuit to each of the engine exhaust circuits facilitates maintaining the required yaw forces without any significant aircraft/engine control system action when one engine is inoperable.

Figure 5:
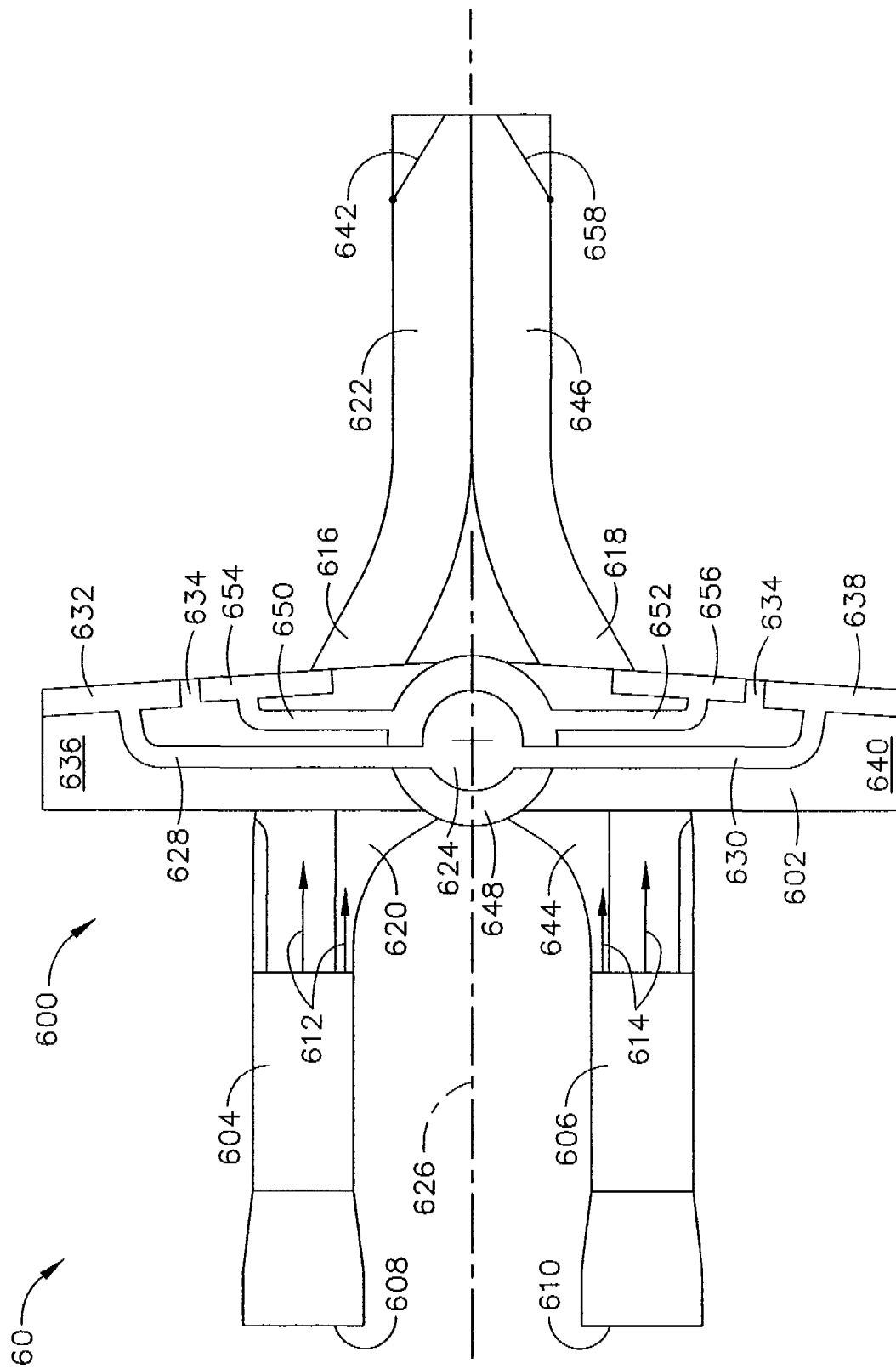
FIG. 5 is a top schematic view of another alternative embodiment of a propulsion system that may be used with a multiple engine assembly.

FIG. 5 is a top schematic view of another alternative embodiment of a propulsion system 600 that may be used with a multiple engine assembly 60. In the exemplary embodiment, engine assembly 60 includes a wing 602, a first engine 604, and a second engine 606. Alternately, propulsion system 600 can be used with engine assemblies 60 having more than two engines. In an exemplary embodiment, engine 604 includes a first inlet 608, and second engine 606 includes a second inlet 610. Inlets 608 and 610 enable air to be channeled into engines 604 and 606, respectively. Exhaust gases 612 from first engine 604 are discharged through a first exhaust duct 616 coupled in flow communication to first engine 604, and exhaust gases 614 from second engine 606 are discharged through a second exhaust duct 618 coupled in flow communication to second engine 606.

In the exemplary embodiment, first duct 616 is coupled in flow communication to a first plenum duct 620 and to a first cruise duct 622. First plenum duct 620 is coupled in flow communication to a first plenum 624. In the exemplary embodiment, at least a portion of plenum 624 is oriented generally perpendicularly and upward from a center line 626 extending between engines 604 and 606. Engine assembly 60 and propulsion system 600 are symmetric on each side of center line 626. In the exemplary embodiment, first plenum 624 is configured similarly to first rotor plenum 224 shown in FIG. 4.

Furthermore, in the exemplary embodiment, first plenum 624 is coupled in flow communication to a plurality of first wing ducts 628 and 630 that extend axially through wing 602 and are oriented in a substantially non-parallel direction to center line 626. In the exemplary embodiment, plenum 624 is coupled to a starboard first wing duct 628 and a port first wing duct 630. Starboard wing duct 628 extends from center line 626 towards a wing starboard end 636 through one portion of wing 602. Port wing duct 630 extends from center line 626 towards a wing port end 640 through the remaining portion of wing 602. Alternately, propulsion system 600 may include more or less than two first wing ducts 628 and 630. Each of first wing ducts 628 and 630 is coupled to a first wing outlet 632 and 638, respectively. In the exemplary embodiment, starboard wing outlet 632 is defined on an aft side 634 of wing 602 on starboard end 636. Similarly, port first wing outlet 638 is defined on aft side 634 of wing 602 on port end 640.

Alternately, exhaust gases 612 may be channeled into first exhaust duct 616, and air (not shown) from an engine fan (not shown) may be channeled into a first fan exhaust duct (not shown). The air from the first fan exhaust duct is discharged into first plenum 624 to facilitate providing fluid to wing ducts 628 and 630 at a lower temperature than exhaust gases 612. In an exemplary embodiment, the air is channeled through wing ducts 628 and 630 to facilitate cooling wing 202. The air is then discharged from wing 202 through outlets (not shown) at the ends of wing ducts 628 and 630. Similarly, exhaust gases 614 may be channeled into second exhaust duct 618, and air (not shown) from an engine fan (not shown) may be channeled into a second fan exhaust duct (not shown). The air from the second fan exhaust duct is discharged into second plenum 648 to facilitate providing fluid to wing ducts 650 and 652 at a lower temperature than exhaust gases 614. In an exemplary embodiment, the air is channeled through wing ducts 650 and 652 to facilitate cooling wing 202. The air is then discharged from wing 202 through outlets (not shown) at the end of wing ducts 650 and 652.

In the exemplary embodiment, first duct 616 is coupled in flow communication to a first cruise duct 622. In the exemplary embodiment, at least a portion of cruise duct 622 is oriented generally parallel to center line 626. In the exemplary embodiment, during pre-defined engine operations, exhaust gases 612 are discharged from duct 616 through first cruise duct 622. First cruise duct 622 is coupled in flow communication to a first cruise nozzle 642. In the exemplary embodiment, cruise nozzles 642 and 658, described in more detail below, are each variable area nozzles. The design, construction, and control of variable area nozzles are known in the art. Nozzles 642 and 658 may utilize clamshell or shutter valve designs as is known in the art. Actuation of nozzles 642 and 658 may be hydraulic, electric, or any other method known in the art. Cruise nozzle 642 is oriented to facilitate enabling exhaust gases 612 to be discharged through cruise nozzle 642 to facilitate propelling the aircraft in a direction that is generally parallel to center line 626.

In the exemplary embodiment, second exhaust duct 618 is coupled in flow communication to a second plenum duct 644 and to a second cruise duct 646. Second plenum duct 644 is coupled in flow communication to a second plenum 648. In the exemplary embodiment, at least a portion of plenum 648 is oriented generally perpendicularly and upward from center line 626. In the exemplary embodiment, a portion of first plenum 624 extends substantially concentrically within a portion of second plenum 648. Alternately, a portion of second plenum 648 extends substantially concentrically within a portion of first plenum 624. Moreover, in the exemplary embodiment, second plenum 648 is configured similarly to second rotor plenum 250 shown in FIG. 4.

Furthermore, in the exemplary embodiment, second plenum 648 is coupled in flow communication to a plurality of second wing ducts 650 and 652 that extend axially through wing 602 and are oriented in a substantially non-parallel direction to center line 626. In the exemplary embodiment, second plenum 648 is coupled in flow communication to a starboard second wing duct 650 and a port second wing duct 652. Starboard wing duct 650 extends from center line 626 towards wing starboard end 636 through one portion of wing 602. Port wing duct 652 extends from center line 626 towards wing port end 640 through the remaining portion of wing 602. Alternately, propulsion system 600 may include more or less than two second wing ducts 650 and 652. Each of second wing ducts 650 and 652 is coupled in flow communication to a second wing outlet 654 and 656, respectively. In the exemplary embodiment, starboard wing outlet 654 is defined on aft side 634 of wing 602 on starboard end 636 between starboard first wing outlet 632 and center line 626. Similarly, port wing outlet 656 is defined on aft side 634 of wing 602 on port end 640 a between port first wing outlet 638 and center line 626. Starboard second wing outlet 654 and port second wing outlet 656 are oriented to facilities enabling exhaust gases 612 and 614 to be discharged through outlets 632, 638, 654 and 656, respectively, to facilitate reducing drag on the aircraft during pre-defined engine operations. Propulsion system 600 with wing ducts 628, 630, 650, and 652 may also facilitate providing other functions, such as, but not limited to, yaw control, wing trailing edge thrust nozzles, or wing cooling.

In the exemplary embodiment, second duct 618 is coupled in flow communication to a second cruise duct 646. In the exemplary embodiment, at least a portion of cruise duct 646 is oriented generally parallel to center line 626 and is positioned adjacent to cruise duct 622. In the exemplary embodiment, exhaust gases 614 are channeled from duct 618 into second cruise duct 646. In the exemplary embodiment, second cruise duct 646 is coupled in flow communication to a second cruise nozzle 658. Cruise nozzle 658 is oriented to facilitate enabling exhaust gases 614 to be discharged through cruise nozzle 658 to facilitate propelling the aircraft in a direction generally parallel to center line 626 during pre-defined engine operations.

When the aircraft is in operation, in the exemplary embodiment, air is channeled through inlets 608 and 610 into engines 604 and 606, respectively. From engines 604 and 606, exhaust gases 612 and 614 are discharged through exhaust ducts 616 and 618, respectively. A portion of exhaust gases 612 and 614 is then channeled through plenum ducts 620 and 644, respectively. The remaining portion of exhaust gases 612 and 614 is channeled through cruise ducts 622 and 646, respectively. The portion of exhaust gases 612 and 614 channeled into plenum ducts 620 and 644, respectively, is then channeled through plenums 624 and 648, respectively. From plenums 624 and 648, exhaust gases 612 and 614 are channeled into wing ducts 628, 630, 650, and 652, respectively, to be discharged through wing outlets 632, 638, 654, and 656, respectively. When exhaust 612 and 614 is discharged through outlets 632, 638, 654, and 656 drag on the aircraft is facilitated to be reduced. The portion of exhaust gases 612 and 614 that is channeled into cruise ducts 622 and 646, respectively, is discharged through cruise nozzles 642 and 658, respectively. Control design and control laws required for actuation of nozzles 642 and 658 during pre-defined engine operations are known in the art. Exhaust gases 612 and 614 are discharged through cruise nozzles 642 and 658, respectively, to facilitate propelling the aircraft in a direction that is generally parallel to center line 626.

The above-described methods and apparatus facilitates simplifying a propulsion system that can be used with a multiple engine assembly. The propulsion system facilitates maintaining independent exhaust circuits for a multiple engine assembly in an aircraft by providing each engine with an exhaust circuit independent from any other engine exhaust circuit. Each engine has an exhaust circuit from the engine to at least two outlets. The propulsion system facilitates isolating one engine from other engines within the assembly. With the engines isolated by the design of the exhaust circuit, isolation valves, actuators, and hydraulic lines are eliminated, facilitating reducing the complexity of the multiple engine installation. If an engine is rendered inoperable, the isolation of each engine facilitates allowing the ability to restart an inoperable engine, and facilitates maintaining control of an aircraft during the inoperability of an engine. The propulsion system facilitates maximizing control at a reduced thrust level since the amount of exhaust is reduced but the distribution fractions are facilitated to be held substantially constant. Control of the aircraft is also facilitated to be increased because, by isolating the exhaust circuits, the exhaust forces stay balanced. The propulsion system also facilitates attempting to restart an inoperable engine without affecting the operation of the other engines in the installation. Pilot operation of an aircraft is facilitated to be simplified because, by using the propulsion system of the current invention, the pilot only needs to attempt restart of an inoperable engine without having to actuate valves.

Exemplary embodiments of a method and apparatus for a multiple engine propulsion system are described above in detail. The method and apparatus is not limited to the specific embodiments described herein, but rather, components of the method and apparatus may be utilized independently and separately from other components described herein. For example, the propulsion system may also be used in combination with other aircraft exhaust gas functions, and is not limited to practice with only the generally horizontal propulsion function, the generally vertical take-off and landing, STOVL, and/or ESTOL functions, and/or the drag reduction function as described herein. Rather, the present invention can be implemented and utilized in connection with many other aircraft propulsion applications.

While the invention has been described in terms of various specific embodiments, those skilled in the art will recognize that the invention can be practiced with modification within the spirit and scope of the claims.

What is claimed is:

1. A method for exhausting gas from an aircraft engine assembly, said method comprising:
    coupling a first exhaust duct in fluid communication only to a first engine, the first exhaust duct comprises a primary outlet and a secondary outlet;
    coupling a second exhaust duct in fluid communication only to a second engine, the second exhaust duct comprises a primary outlet and a secondary outlet;
    aligning a portion of the first engine secondary outlet concentrically within a portion of the second engine secondary outlet;
    coupling the first engine secondary outlet to a first passageway defined within a rotor, said rotor including a first airfoil portion and a second opposing airfoil portion, the first passageway extending to a trailing edge of the first airfoil portion and the second airfoil portion; and
    coupling the second engine secondary outlet to a second passageway defined within the at least one of a wing and a rotor, the second passageway extending to the trailing edge of the first airfoil portion and the second airfoil portion, wherein the first passageway is adjacent to the second passageway such that gases flowing through the first passageway and the second passageway are channeled in substantially the same direction through the at least one of a wing and a rotor.

2. A method in accordance with claim 1 further comprising:
    coupling the first exhaust duct to a first cruise nozzle; and
    coupling the second exhaust duct to a second cruise nozzle.

3. A method in accordance with claim 1 further comprising:
    coupling the first exhaust duct to at least one first lift nozzle; and
    coupling the second exhaust duct to at least one second lift nozzle, wherein a portion of the at least one first lift nozzle is concentric with a portion of the at least one second lift nozzle.

4. A method in accordance with claim 1 further comprising coupling at least one directional control to at least one of the first exhaust duct and the second exhaust duct.

5. A method in accordance with claim 1 further comprising:
    coupling a first plenum to the first exhaust duct; and
    coupling a second plenum to the second exhaust duct, wherein a portion of the first plenum is concentric with a portion of the second plenum.

6. A method in accordance with claim 5 further comprising:
    coupling the first plenum to a first rotor outlet; and
    coupling the second plenum to a second rotor outlet.

7. A method in accordance with claim 6 further comprising coupling a variable area tip nozzle to the first rotor outlet; and
    coupling a variable area tip nozzle to the second rotor outlet.

8. An engine assembly comprising:
    a first engine comprising a first exhaust duct coupled in fluid communication only to said first engine, said first exhaust duct comprises a primary outlet and a secondary outlet; and
    a second engine comprising a second exhaust duct coupled in fluid communication only to said second engine, said second exhaust duct comprises a primary outlet and a secondary outlet, a portion of said first engine secondary outlet is aligned substantially concentrically within a portion of said second engine secondary outlet, said first engine secondary outlet is coupled to a first passageway defined within a rotor and said second engine secondary outlet is coupled to a second passageway defined within said rotor, said rotor including a first airfoil portion and a second opposing airfoil portion, the first passageway extending to a trailing edge of the first airfoil portion and the second airfoil portion and the second passageway extending to the trailing edge of the first airfoil portion and the second airfoil portion.

9. An engine assembly in accordance with claim 8 wherein said engine assembly further comprises a first plenum coupled to said first exhaust duct and a second plenum coupled to said second exhaust duct, wherein a portion of said first plenum is aligned substantially concentrically within a portion of said second plenum.

10. An engine assembly in accordance with claim 9 wherein said first plenum is coupled to a first rotor outlet, and said second plenum is coupled to a second rotor outlet, said first rotor outlet comprises at least one first variable area tip nozzle, and wherein said second rotor outlet comprises at least one second variable area tip nozzle.

11. An engine assembly in accordance with claim 8 wherein said first engine primary outlet is coupled to a first cruise nozzle and said second engine primary outlet is coupled to a second cruise nozzle.

12. An engine assembly in accordance with claim 8 wherein said first exhaust duct is coupled to at least one first lift nozzle, and said second exhaust duct is coupled to at least one second lift nozzle, wherein a portion of said at least one first lift nozzle is aligned substantially concentrically within a portion of said at least one second lift nozzle.

13. An engine assembly in accordance with claim 8 further comprising at least one directional control coupled to at least one of said first exhaust duct and said second exhaust duct.

14. A propulsion system for an aircraft, said propulsion system comprising:
a first engine comprising a first exhaust duct coupled in flow communication only to said first engine; and
a second engine comprising a second exhaust duct coupled in flow communication only to said second engine, wherein said first exhaust duct comprises a primary exhaust and a secondary exhaust, said second exhaust duct comprises a primary exhaust and a secondary exhaust, wherein said first engine secondary exhaust is coupled to a first passageway defined within a rotor and said second engine secondary exhaust is coupled to a second passageway defined within said rotor, said rotor including a first airfoil portion and a second opposing airfoil portion, the first passageway and the second passageway each extending to a trailing edge of the first airfoil portion and the second airfoil portion, and wherein said first passageway is adjacent to said second passageway such that gases flowing through said first passageway and said second passageway are channeled in substantially the same direction through said rotor.

15. A propulsion system in accordance with claim 14 wherein said first engine primary exhaust is coupled to a first cruise nozzle and said second engine primary exhaust is coupled to a second cruise nozzle.

16. A propulsion system in accordance with claim 14 wherein said first exhaust duct is coupled to at least one first lift nozzle, and said second exhaust duct is coupled to at least one second lift nozzle, wherein said at least one first lift nozzle is aligned substantially concentrically within said at least one second lift nozzle.

17. A propulsion system in accordance with claim 14 further comprising at least one directional control coupled to at least one of said first exhaust duct and said second exhaust duct.

18. A propulsion system in accordance with claim 14 wherein said propulsion system further comprises a first plenum coupled to said first exhaust duct and a second plenum coupled to said second exhaust duct, wherein a portion of said first plenum is aligned substantially concentrically within a portion of said second plenum.

19. A propulsion system in accordance with claim 17 wherein said first plenum is coupled to a first rotor outlet, and said second plenum is coupled to second rotor outlet.

20. A propulsion system in accordance with claim 19 wherein said first rotor outlet comprises at least one first variable area tip nozzle, and wherein said second rotor outlet comprises at least one second variable area tip nozzle.

\* \* \* \* \*